US012741902B2

(12) United States Patent
Mao et al.

(10) Patent No.: US 12,741,902 B2
(45) Date of Patent: Sep. 22, 2026

(54) ENVIRONMENT-FRIENDLY GLASS MATERIAL

(71) Applicant: CDGM GLASS CO., LTD, Chengdu (CN)

(72) Inventors: Lulu Mao, Chengdu (CN); Liangzhen Hao, Chengdu (CN); Sai Li, Chengdu (CN); Bo Kuang, Chengdu (CN); Peng Zhang, Chengdu (CN)

(73) Assignee: CDGM GLASS CO., LTD, Chengdu (CN)

( * ) Notice: Subject to any disclaimer, the term of this patent is extended or adjusted under 35 U.S.C. 154(b) by 777 days.

(21) Appl. No.: 17/928,832

(22) PCT Filed: May 12, 2021

(86) PCT No.: PCT/CN2021/093268
§ 371 (c)(1),
(2) Date: Nov. 30, 2022

(87) PCT Pub. No.: WO2022/001385
PCT Pub. Date: Jan. 6, 2022

(65) Prior Publication Data

US 2023/0202910 A1 Jun. 29, 2023

(30) Foreign Application Priority Data

Jun. 30, 2020 (CN) ......................... 202010610609.6

(51) Int. Cl.
*C03C 4/10* (2006.01)
*C03B 19/02* (2006.01)
(Continued)

(52) U.S. Cl.
CPC ................ *C03C 4/10* (2013.01); *C03B 19/02* (2013.01); *C03B 25/02* (2013.01); *C03C 3/062* (2013.01);
(Continued)

(58) Field of Classification Search
CPC .............................. C03C 4/10; C03C 2204/00
See application file for complete search history.

(56) References Cited

U.S. PATENT DOCUMENTS

2005/0054515 A1* 3/2005 Kolberg .................. C03C 3/089 501/72
2008/0063876 A1* 3/2008 Sakoske .................... C03C 8/04 428/432

FOREIGN PATENT DOCUMENTS

CN 1131130 A 9/1996
CN 1406894 A 4/2003
(Continued)

OTHER PUBLICATIONS

Jul. 30, 2021 International Search Report issued in International Patent Application No. PCT/CN2021/093268.
(Continued)

*Primary Examiner* — Cameron K Miller
(74) *Attorney, Agent, or Firm* — Oliff PLC

(57) ABSTRACT

An environment-friendly glass material, including components like $SiO_2$, ZnO, alkali metal oxide and S, but does not contain Cd, wherein when the thickness of the environment-friendly glass material is 3 mm, the cutoff wavelength is above 550 nm, the transmittance at 800-850 nm is above 75%, the transmittance at 850-900 nm is above 80%, the transmittance at 900-1000 nm is above 83%, and the transmittance at 1000-2000 nm is above 85%. Through rational component design, the glass material of the present invention realizes environmental protection, UV and visible light cutoff, and high near-infrared transmittance at the same time.

22 Claims, 1 Drawing Sheet

(51) Int. Cl.
*C03B 25/02* (2006.01)
*C03C 3/062* (2006.01)
*C03C 3/066* (2006.01)
*C03C 3/078* (2006.01)
*C03C 3/097* (2006.01)
*C03C 3/112* (2006.01)
*C03C 3/115* (2006.01)

(52) U.S. Cl.
CPC .............. *C03C 3/066* (2013.01); *C03C 3/078* (2013.01); *C03C 3/097* (2013.01); *C03C 3/112* (2013.01); *C03C 3/115* (2013.01); *C03C 2204/00* (2013.01)

(56) References Cited

FOREIGN PATENT DOCUMENTS

| | | | |
|---|---|---|---|
| CN | 1406897 | A | 4/2003 |
| CN | 1467168 | A | 1/2004 |
| CN | 111148725 | A | 5/2020 |
| CN | 111517640 | A | 8/2020 |
| CN | 111662008 | A | 9/2020 |

OTHER PUBLICATIONS

Jul. 30, 2021 Written Opinion issued in International Patent Application No. PCT/CN2021/093268.

* cited by examiner

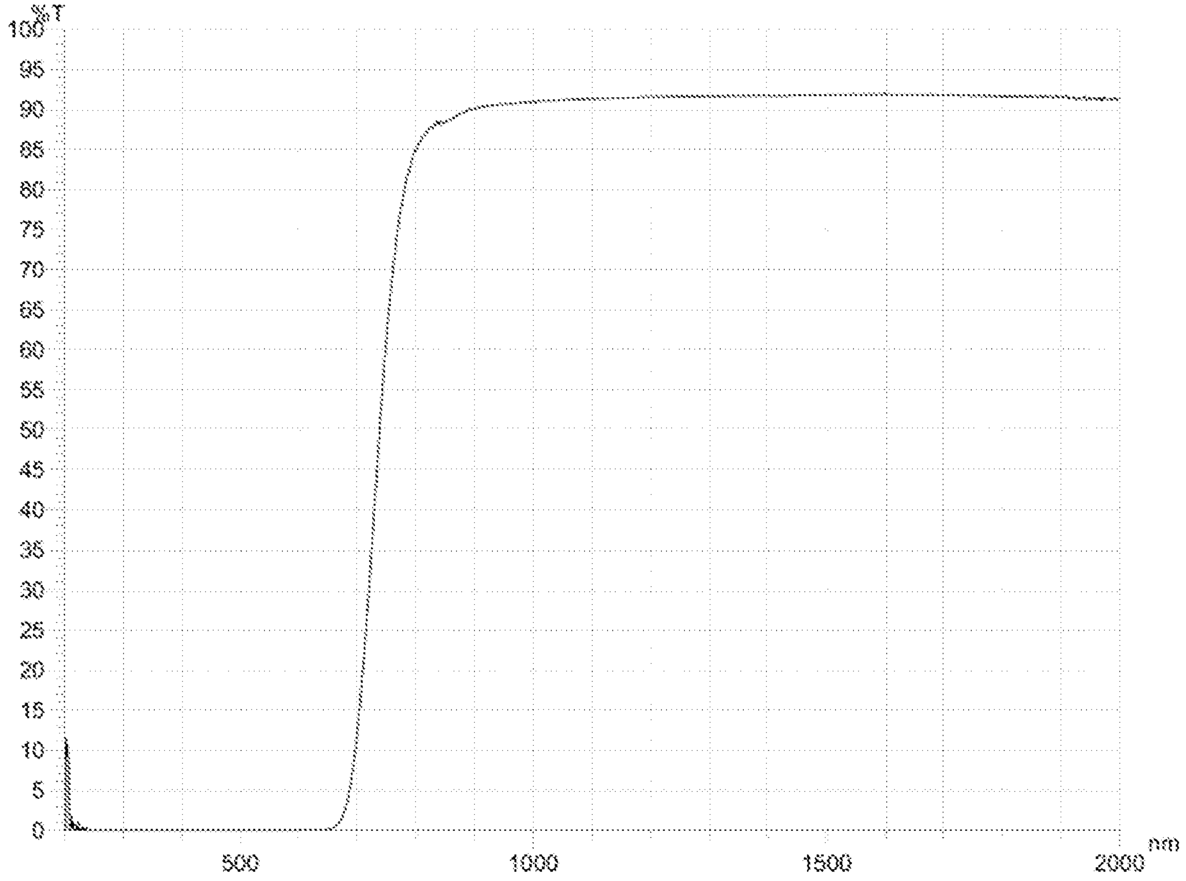
%T
100
95
90
85
80
75
70
65
60
55
50
45
40
35
30
25
20
15
10
5
0
500
1000
1500
2000
nm

ENVIRONMENT-FRIENDLY GLASS MATERIAL

TECHNICAL FIELD

The present invention relates to a glass material, in particular to an environment-friendly glass material featuring UV and visible light cutoff and high near-infrared transmittance.

BACKGROUND

With the development of optoelectronic industry in recent years, the application of 800 nm-2000 nm near-infrared band detection becomes increasingly high, especially for the smart device. The near-infrared laser is urgently required for real-time sensing of the surrounding environment, so as to provide decisions for the action and movement of the smart device. The implementation is based on that the optical system needs to filter out the UV and visible light bands with interference to near-infrared working band, and higher transmittance is required at the near-infrared band.

The traditional selenium cadmium glass can cut off the UV-visible band and has higher near-infrared band transmittance. The disadvantage thereof lies in that the glass contains a large amount of cadmium (Cd), which fails to meet the current environmental protection standards and brings great harm to the environment and human body in production, use, scrapping and other aspects; in addition, the selenium cadmium glass has poor chemical stability and is not suitable for smart devices that need to withstand harsh environment.

SUMMARY

The technical problem to be solved by the present invention is to provide an environment-friendly glass material featuring UV and visible light cutoff and high near-infrared transmittance.

To solve the technical problem, the technical scheme of the present invention provides:

(1) An environment-friendly glass material, comprising components like $SiO_2$, ZnO, alkali metal oxide and S, but does not contain Cd, wherein when the thickness of the environment-friendly glass material is 3 mm, the cutoff wavelength is above 550 nm, the transmittance at 800-850 nm is above 75%, the transmittance at 850-900 nm is above 80%, the transmittance at 900-1000 nm is above 83%, and the transmittance at 1000-2000 nm is above 85%.

(2) The environment-friendly glass material according to (1), wherein when the thickness of the environment-friendly glass material is 3 mm, the cutoff wavelength is above 600 nm, the cutoff wavelength is preferably above 650 nm, the cutoff wavelength is more preferably above 680 nm, and the cutoff wavelength is further preferably above 700 nm.

(3) The environment-friendly glass material according to (1), wherein when the thickness of the environment-friendly glass material is 3 mm, the transmittance at 800-850 nm is above 77%, and the transmittance at 800-850 nm is preferably above 80%.

(4) The environment-friendly glass material according to (1), wherein when the thickness of the environment-friendly glass material is 3 mm, the transmittance at 850-900 nm is above 82%, and the transmittance at 850-900 nm is preferably above 83%.

(5) The environment-friendly glass material according to (1), wherein when the thickness of the environment-friendly glass material is 3 mm, the transmittance at 900-1000 nm is above 84%, and the transmittance at 900-1000 nm is preferably above 85%.

(6) The environment-friendly glass material according to (1), wherein when the thickness of the environment-friendly glass material is 3 mm, the transmittance at 1000-2000 nm is above 86%, and the transmittance at 1000-2000 nm is preferably above 87%.

(7) The environment-friendly glass material according to (1), comprising the following components by weight percentage: 35-80% of $SiO_2$; 5-35% of ZnO; 5-25% of $Na_2O$; 1-10% of $K_2O$; 0.2-8% of S; 0.5-10% of Sb+Ag+Ce+Sn+Te+V+Fe.

(8) The environment-friendly glass material according to (7), further comprising the following components by weight percentage: 0-5% of $Li_2O$; and/or 0-10% of $B_2O_3$; and/or 0-5% of $Al_2O_3$; and/or 0-5% of MgO; and/or 0-5% of CaO; and/or 0-10% of SrO; and/or 0-10% of BaO; and/or 0-5% of Se; and/or 0-5% of F.

(9) The environment-friendly glass material, comprising the following components by weight percentage: 35-80% of $SiO_2$; 5-35% of ZnO; 5-25% of $Na_2O$; 1-10% of $K_2O$; 0-5% of $Li_2O$; 0.2-8% of S; 0.5-10% of Sb+Ag+Ce+Sn+Te+V+Fe; 0-10% of $B_2O_3$; 0-5% of $Al_2O_3$; 0-5% of MgO; 0-5% of CaO; 0-10% of SrO; 0-10% of BaO; 0-5% of Se; 0-5% of F and do not contain Cd.

(10) The environment-friendly glass material according to any of (1)-(9), comprising the following components by weight percentage: 40-75% of $SiO_2$; and/or 7-30% of ZnO; and/or 7-22% of $Na_2O$; and/or 2-8% of $K_2O$; and/or 0-3% of $Li_2O$; and/or 0.5-7% of S; and/or 0.8-9% of Sb+Ag+Ce+Sn+Te+V+Fe; and/or 0-5% of $B_2O_3$; and/or 0-3% of $Al_2O_3$; and/or 0-3% of MgO; and/or 0-3% of CaO; and/or 0-5% of SrO; and/or 0-5% of BaO; and/or 0-4% of Se; and/or 0-3% of F.

(11) The environment-friendly glass material according to any of (1)-(9), comprising the following components by weight percentage: 42-73% of $SiO_2$; and/or 9-25% of ZnO; and/or 8-19% of $Na_2O$; and/or 3-7% of $K_2O$; and/or 1-6% of S; and/or 0.9-8% of Sb+Ag+Ce+Sn+Te+V+Fe; and/or 0-3% of Se; and/or 0-2% of $Li_2O$; and/or 0-3% of $B_2O_3$; and/or 0-1% of $Al_2O_3$; and/or 0-2% of MgO; and/or 0-2% of CaO; and/or 0-2% of SrO; and/or 0-2% of BaO; and/or 0-1% of F.

(12) The environment-friendly glass material according to any of (1)-(9), comprising the following components by weight percentage: 0-0.5% of $CuO+TiO_2+P_2O_5$, preferably 0.0001-0.5% of $CuO+TiO_2+P_2O_5$, more preferably 0.0001-0.4% of $CuO+TiO_2+P_2O_5$, further preferably 0.0001-0.3% of $CuO+TiO_2+P_2O_5$.

(13) The environment-friendly glass material according to any of (1)-(9), wherein the component thereof is expressed in weight percentage, $B_2O_3/SiO_2$ is below 0.23, $B_2O_3/SiO_2$ is preferably below 0.15, and $B_2O_3/SiO_2$ is more preferably below 0.1.

(14) The environment-friendly glass material according to any of (1)-(9), wherein the component thereof is expressed in weight percentage, $ZnO/SiO_2$ is 0.07-0.95, $ZnO/SiO_2$ is preferably 0.10-0.75, and $ZnO/SiO_2$ is more preferably 0.15-0.60.

(15) The environment-friendly glass material according to any of (1)-(9), wherein the component thereof is expressed in weight percentage, Se/S is below 1.5, Se/S is preferably below 1.3, Se/S is more preferably below 1.0, and Se/S is further preferably below 0.5.

(16) The environment-friendly glass material according to any of (1)-(9), wherein the component thereof is expressed in weight percentage, (Sb+Ag+Ce+Sn+Te+V+Fe)/(Se+S) is 0.1-25.0, (Sb+Ag+Ce+Sn+Te+V+Fe)/(S+Se) is preferably 0.2-15.0, (Sb+Ag+Ce+Sn+Te+V+Fe)/(S+Se) is more preferably 0.5-8.0, and (Sb+Ag+Ce+Sn+Te+V+Fe)/(S+Se) is further preferably 1.0-5.0.

(17) The environment-friendly glass material according to any of (1)-(9), wherein the component thereof is expressed in weight percentage, (Ag+Ce+Sn+Te+V+Fe)/Sb is below 3.0, (Ag+Ce+Sn+Te+V+Fe)/Sb is preferably below 2.0, (Ag+Ce+Sn+Te+V+Fe)/Sb is more preferably below 1.0, and (Ag+Ce+Sn+Te+V+Fe)/Sb is further preferably below 0.8.

(18) The environment-friendly glass material according to any of (1)-(9), wherein the component thereof is expressed in weight percentage, $Li_2O+Na_2O+K_2O$ is 8-35%, $Li_2O+Na_2O+K_2O$ is preferably 9-30%, and $Li_2O+Na_2O+K_2O$ is more preferably 10-22%.

(19) The environment-friendly glass material according to any of (1)-(9), wherein the material does not contain $B_2O_3$; and/or does not contain $Li_2O$; and/or does not contain Sn; and/or does not contain Te.

(20) The environment-friendly glass material according to (9), wherein when the thickness of the environment-friendly glass material is 3 mm, the cutoff wavelength is above 550 nm, the cutoff wavelength is preferably above 600 nm, the cutoff wavelength is more preferably above 650 nm, the cutoff wavelength is further preferably above 680 nm, and the cutoff wavelength is more further preferably above 700 nm.

(21) The environment-friendly glass material according to (9), wherein when the thickness of the environment-friendly glass material is 3 mm, the transmittance at 800-850 nm is above 75%, the transmittance at 800-850 nm is preferably above 77%, and the transmittance at 800-850 nm is more preferably above 80%; and/or when the thickness of the environment-friendly glass material is 3 mm, the transmittance at 850-900 nm is above 80%, the transmittance at 850-900 nm is preferably above 82%, and the transmittance at 850-900 nm is more preferably above 83%; and/or when the thickness of the environment-friendly glass material is 3 mm, the transmittance at 900-1000 nm is above 83%, the transmittance at 900-1000 nm is preferably above 84%, and the transmittance at 900-1000 nm is more preferably above 85%; and/or when the thickness of the environment-friendly glass material is 3 mm, the transmittance at 1000-2000 nm is above 85%, the transmittance at 1000-2000 nm is preferably above 86%, and the transmittance at 1000-2000 nm is more preferably above 87%.

(22) The environment-friendly glass material according to any of (1)-(9), wherein acid resistance stability of the environment-friendly glass material is above Class 3, preferably above Class 2, more preferably Class 1; and/or water resistance stability is above Class 3, preferably above Class 2, more preferably Class 1; and/or thermal expansion coefficient is above $80\times10^{-7}$/K, preferably above $85\times10^{-7}$/K, more preferably above $90\times10^{-7}$/K, further preferably above $95\times10^{-7}$/K.

(23) A glass preform, made of the environment-friendly glass material according to any of (1)-(22).

(24) A glass element, made of the environment-friendly glass material according to any of (1)-(22) or the glass preform according to (23)

(25) A device, comprising the environment-friendly glass material according to any of (1)-(22), and/or comprising the glass element according to (24).

(26) The manufacturing method of the environment-friendly glass material according to any of (1)-(22), wherein the method comprises the following steps:

1) mixing all raw materials according to the component proportion of the environment-friendly glass material, putting the evenly mixed raw materials into a smelting furnace for melting at 1300-1500° C. to form molten glass;
2) stirring and homogenizing the molten glass;
3) pouring or leaking the molten glass into a mould for molding;
4) maintaining the glass molded in step 3) at 470-600° C. for 10-60 hours to perform color development, or maintaining at 470-600° C. for 10-60 hours to perform color development after the glass molded in step 3) is further processed into a glass preform or a glass element.

(27) The manufacturing method of the environment-friendly glass material according to (26), wherein the raw material of the environment-friendly glass material uses compound salt, and/or hydroxide, and/or oxide, and/or sulfide, and/or selenide, and/or fluoride, and/or elementary substance.

The beneficial effects of the present invention are as follows: Through rational component design, the glass material of the present invention realizes environmental protection, UV and visible light cutoff and high near-infrared transmittance at the same time.

BRIEF DESCRIPTION OF THE DRAWINGS

FIG. 1 is a curve graph for spectral transmittance of the environment-friendly glass material in Embodiment 2 of the present invention.

DETAILED DESCRIPTION

The implementations of the present invention will be described in detail below, but the present invention is not limited to the following implementations. Appropriate changes may be made within the scope of the purpose of the present invention for implementation. In addition, the repeated descriptions will not limit the aim of the invention although with appropriate omissions. In the following, the environment-friendly glass material of the present invention is sometimes referred to as glass.

[Environment-Friendly Glass Material]

Hereinafter, the components (ingredients) of the environment-friendly glass material provided by the present invention will be described. If not specified herein, the content of each component and the total content are expressed in weight percentage (wt %).

Unless otherwise noted in specific circumstances, the numerical range listed herein includes upper and lower limits, and the words “above” and “below” include the endpoint values as well as all integers and fractions within the range, but not limited to the specific values listed when the range is limited. “And/or” mentioned herein is inclusive. For example, “A and/or B” refers to only A, or only B, or both A and B.

<Necessary Components and Optional Components>

$SiO_2$ serves as a key component of the present glass. In the glass of the present invention, an appropriate amount of $SiO_2$ can ensure stable coloring, and enable the glass to realize the desired cutoff performance. Meanwhile, an appropriate amount of $SiO_2$ can enhance the chemical stability of the glass. If the content of $SiO_2$ is less than 35%, the cutoff performance of the glass fails to meet the design requirements, and meanwhile the chemical stability of the glass declines rapidly. Therefore, in the present invention, the lower limit of the $SiO_2$ content is 35%, preferably 40%, more preferably 42%. If the content of $SiO_2$ is higher than 80%, melting temperature of the glass rises sharply, volatilization of coloring substance increases, and the cutoff performance of the glass decreases; meanwhile, high-temperature viscosity of the glass increases sharply, and bubbles and inclusions in the product rise sharply. Therefore, in the present invention, the upper limit of the $SiO_2$ content is 80%, preferably 75%, more preferably 73%.

$B_2O_3$ in the glass of the present invention can improve the melting performance and enhance the inherent quality and chemical stability of the glass. However, according to the researches by the present inventor, $B_2O_3$ in the glass will cause changes in glass structure, and increase the binding threshold of the coloring substance, so that the cutoff capacity of the glass declines. Therefore, in case that the cutoff capacity of the glass meets the requirements, less than 10% of $B_2O_3$ can be contained to enhance the melting performance and chemical stability of the glass, and the content of $B_2O_3$ is preferably below 5%, more preferably below 3%. In some implementations, it further preferably contains no $B_2O_3$.

It is found from a large number of experimental studies of the present invention that, in some implementations, by keeping $B_2O_3/SiO_2$ below 0.23, the cutoff performance of the glass can be optimized, and meanwhile water resistance stability of the glass can be increased. $B_2O_3/SiO_2$ is preferably below 0.15, and $B_2O_3/SiO_2$ is more preferably below 0.1.

ZnO in the glass can enhance the chemical stability of the glass, and decrease the high-temperature viscosity of the glass. This can reduce the volatilization of the coloring substance in the smelting stage with the cooperation of $SiO_2$, and meanwhile promote the structural transformation of the coloring substance and enhance the cutoff performance of the glass. If the content of ZnO is less than 5%, the cutoff performance of the glass fails to meet the requirements, and the chemical stability of the glass decreases. Therefore, the lower limit of the ZnO content is 5%, preferably 7%, more preferably 9%. If the content of ZnO exceeds 35%, the glass is prone to devitrification, especially in molding and annealing stages, which will greatly decrease the near-infrared transmittance of the glass. Therefore, the upper limit of the ZnO content is 35%, preferably 30%; more preferably 25%.

In some implementations of the present invention, if the value of $ZnO/SiO_2$ is less than 0.07, the chemical stability of the glass fails to meet the design requirements, and the cutoff capacity of the glass declines. If the value of $ZnO/SiO_2$ is higher than 0.95, the glass is prone to devitrification of non-coloring substance, which is easy to lead to a rapid decline in near-infrared transmittance, especially at 800-1000 nm. Therefore, the value of $ZnO/SiO_2$ is preferably 0.07-0.95, more preferably 0.10-0.75, further preferably 0.15-0.60. In this case, the threshold of glass coloring substance formation decreases, which is conducive to enhancing both the cutoff performance and the near-infrared transmittance.

$Li_2O$, $Na_2O$ and $K_2O$, belonging to alkali metal oxide, in the glass of the present invention can decrease the high-temperature viscosity of the glass, and reduce bubbles and inclusions in the glass. While decreasing the high-temperature viscosity, it can also enhance the solubility of the coloring substance, and enhance the cutoff performance of the glass. In addition, the alkali metal oxide can provide more free oxygen, and enhance the near-infrared transmittance of the glass while achieving better cutoff performance. If the content thereof is less than 8%, the above effect is not obvious, and meanwhile the expansion coefficient of the glass is lower than the design target, so that it cannot be well matched with the materials with high expansion coefficient and high hardness. If the content thereof is higher than 35%, the glass is prone to devitrification, resulting in the decline of cutoff performance and near-infrared transmittance of the glass, as well as the rapid decline of chemical stability. Therefore, the total content of alkali metal oxides $Li_2O+Na_2O+K_2O$ is 8-35%, preferably 9-30%, more preferably 10-22%.

$Li_2O$ is highly capable of decreasing the high-temperature viscosity of the glass, which is conducive to enhancing the inherent quality of the glass. However, the present inventor finds that Li ion features strong aggregation in the glass and can interfere with the structural transformation of the coloring substance, so as to decrease the cutoff performance of the glass. Especially when the content thereof is higher than 5%, the glass does not achieve the desired cutoff performance. Therefore, the content of $Li_2O$ is preferably below 5%, more preferably below 3%, further preferably below 2%. In some implementations, it more further preferably contains no $Li_2O$.

$Na_2O$ in the glass can decrease the high-temperature viscosity of the glass, and decrease the structural change threshold of the coloring substance. Meanwhile, it can enhance the near-infrared transmittance of the glass, enhance the thermal expansion coefficient of the glass, and facilitate the coupling between the glass of the present invention and the high-strength transparent material. If the content of $Na_2O$ is less than 5%, the near-infrared transmittance of the glass fails to meet the design requirements, the cutoff performance of the glass declines, and the thermal expansion coefficient of the glass is lower than the design requirements. Therefore, the lower limit of the $Na_2O$ content is 5%, preferably 7%, more preferably 8%. If the content of $Na_2O$ is higher than 25%, the chemical stability of the glass decreases, the glass is prone to devitrification, resulting in the increase of structural change threshold of the coloring substance and the decline of cutoff performance of the glass. Therefore, the upper limit of the $Na_2O$ content is 25%, preferably 22%, more preferably 19%.

In the present glass system, the effect of $K_2O$ is similar to that of $Na_2O$, but $K_2O$ has stronger capability than $Na_2O$ in terms of enhancing the near-infrared; on the other hand, $K_2O$ has stronger capability than $Na_2O$ in terms of decreasing the chemical stability and devitrification resistance of the glass. Therefore, from the perspective of optimizing the chemical stability, devitrification resistance performance and cutoff capacity of the glass, the content of $K_2O$ is confined to 1-10%, preferably 2-8%, more preferably 3-7%.

$Al_2O_3$ in the glass can enhance the chemical stability of the glass, but also cause the decline in cutoff performance of the glass. If the content thereof exceeds 5%, the cutoff performance of the glass fails to meet the design requirements. Therefore, the content of $Al_2O_3$ is below 5%, preferably below 3%. In case of surplus chemical stability of the glass, the content of $Al_2O_3$ is more preferably below 1%.

MgO can improve the chemical stability of the glass. However, if the content thereof exceeds 5%, the devitrification resistance performance of the glass decreases, resulting in the decline of cutoff capacity of the glass and the decline of near-infrared transmittance of the glass. Therefore, the content of MgO is confined to be below 5%, preferably below 3%, more preferably below 2%.

CaO can enhance the stability and devitrification resistance performance of the glass, and decrease the high-temperature viscosity of the glass. If the content thereof exceeds 5%, it will interfere with the structural formation of the coloring substance and decrease the cutoff performance of the glass. Therefore, the content of CaO is confined to be below 5%, preferably below 3%, more preferably below 2%.

An appropriate amount of BaO and SrO in the glass can improve the chemical stability of the glass, increase the hardness of the glass, and enhance the near-infrared transmittance of the glass. However, if the content thereof exceeds 10%, the capability of fixing the coloring substance of the glass decreases, which will bring the risk of cutoff capacity decline. Therefore, the content of BaO and SrO is confined to be below 10% respectively, preferably below 5%, more preferably below 2%.

F in the glass can enhance the melting performance of the glass, reduce the volatilization of the coloring substance in the feeding stage, and enhance the cutoff performance of the glass. However, if the content thereof exceeds 5%, the high-temperature viscosity of the glass declines rapidly, which will cause excessive volatilization of the coloring substance. Therefore, the content of F is below 5%, preferably below 3%, more preferably below 1%, further preferably 0% from the perspective of environmental protection.

S can form a coloring substance with Sb, Ag, Ce, Sn, Te, V, Fe, etc. in the glass of the present invention, so that the glass produces cutoff absorption in the band before 500-720 nm. If the content of S exceeds 8%, the glass is prone to devitrification, and the near-infrared transmittance declines sharply; if the content thereof is less than 0.2%, the cutoff performance of the glass fails to meet the design requirements. Therefore, the content of S is confined to 0.2-8%, preferably 0.5-7%, more preferably 1-6%. The content of S in the present invention refers to the content of sulfur in all sulfur-containing substances in the glass that are completely converted to elemental sulfur. In the present invention, S can be introduced by means of elemental sulfur and/or sulfur-containing compounds.

Se can form a coloring substance with Sb, Ag, Ce, Sn, Te, V, Fe, etc. in the glass of the present invention, so that the glass produces cutoff absorption in the band before 650-1200 nm, and the cutoff performance is better than that of S elementary substance or sulfide. If the content of Se exceeds 5%, the glass is prone to devitrification, and the near-infrared transmittance declines sharply. Therefore, the content of Se in the present glass system is below 5%, preferably below 4%, more preferably below 3%, further preferably 0% in case that the cutoff performance meets the design requirements. The content of Se in the present invention refers to the content of selenium in all selenium-containing substances in the glass that are completely converted to elemental selenium. In the present invention, Se can be introduced by means of elemental selenium and/or selenium-containing compounds.

It is found from a large number of experimental studies of the present invention that, in some implementations, if the value of Se/S is greater than 1.5, the transmittance of the glass at 800-1000 nm fails to meet the design requirements. Therefore, the value of Se/S is preferably below 1.5, more preferably below 1.3, further preferably below 1.0, more further preferably below 0.5.

One or more of components like Sb, Ag, Ce, Sn, Te, V and Fe in the glass of the present invention can form coloring compounds with S and/or Se. If the total content Sb+Ag+Ce+Sn+Te+V+Fe exceeds 10%, the glass is prone to devitrification, resulting in the sharp decline of the near-infrared transmittance. If the total content Sb+Ag+Ce+Sn+Te+V+Fe is less than 0.5%, few coloring substances are formed in the glass, which fails to the design cutoff performance. Therefore, the content of Sb+Ag+Ce+Sn+Te+V+Fe is 0.5-10%, preferably 0.8-9%, more preferably 0.9-8%. The content of Sb+Ag+Ce+Sn+Te+V+Fe in the present invention refers to the total content of Sb in Sb-containing substances, Ag in Ag-containing substances, Ce in Ce-containing substances, Sn in Sn-containing substances, Te in Te-containing substances, V in V-containing substances and Fe in Fe-containing substances in the glass that are completely converted to elementary substance. Sb, Ag, Ce, Sn, Te, V and Fe can be introduced by means of oxides, and/or sulfides, and/or selenides, and/or fluorides, and/or elementary substance, and/or compound salts, and/or hydroxides, etc. In some implementations of the present invention, it preferably contains no Sn and/or Te.

In some implementations of the present invention, if (Sb+Ag+Ce+Sn+Te+V+Fe)/(S+Se) is less than 0.1, the near-infrared transmittance of the glass declines significantly; if (Sb+Ag+Ce+Sn+Te+V+Fe)/(S+Se) exceeds 25.0, the cutoff performance of the glass declines significantly and the devitrification resistance capability of the glass declines sharply. Therefore, the value of (Sb+Ag+Ce+Sn+Te+V+Fe)/(S+Se) is preferably 0.1-25.0, the value of (Sb+Ag+Ce+Sn+Te+V+Fe)/(S+Se) is more preferably 0.2-15.0, the value of (Sb+Ag+Ce+Sn+Te+V+Fe)/(S+Se) is further preferably 0.5-8.0, and the value of (Sb+Ag+Ce+Sn+Te+V+Fe)/(S+Se) is more further preferably 1.0-5.0.

In some implementations of the present invention, when Sb, Ag, Ce, Sn, Te, V and Fe form the coloring substance with anions in the glass, the synergistic effect exists; when the value of (Ag+Ce+Sn+Te+V+Fe)/Sb is greater than 3.0, the near-infrared transmittance of the glass declines significantly. Therefore, the value of (Ag+Ce+Sn+Te+V+Fe)/Sb is preferably below 3.0, more preferably below 2.0, further preferably below 1.0, more further preferably below 0.8.

In some implementations of the present invention, one or more of CuO, $TiO_2$ and $P_2O_5$ promote the formation of the coloring substance in the glass of the present invention, but when the total content of CuO, $TiO_2$ and $P_2O_5$ ($CuO+TiO_2 \pm P_2O_5$) exceeds 0.5%, the glass is particularly prone to devitrification, resulting in negative changes in the structure of the coloring substance and the sharp decline of the near-infrared transmittance. Therefore, the content of $CuO+TiO_2+P_2O_5$ is below 0.5%. On the other hand, if $CuO+TiO_2 \pm P_2O_5$ is less than 0.0001%, the coloring substance can only be formed by the impurity defects in the glass, resulting in poor cutoff performance, poor coloring uniformity of the glass and other problems. Therefore, $CuO+TiO_2+P_2O_5$ is preferably 0.0001-0.5%, more preferably 0.0001-0.4%, further preferably 0.0001-0.3%. The content of CuO, $TiO_2$ and $P_2O_5$ in the present invention is not included in is the 100 wt % constituted by the content of all other components except CuO, $TiO_2$ and $P_2O_5$ described in the present invention.

<Unnecessary Components>

In order to achieve environmental friendliness, Cd, As and Pb are not contained in the glass of the present invention.

The terms "not contained" and "0%" as used herein mean that the compound, molecule or element and the like are not intentionally added to the glass of the present invention as raw materials; however, as raw materials and/or equipment for the production of glass, there will be some impurities or components that are not intentionally added in small or trace amounts in the final glass, and this situation also falls within the protection scope of the present invention patent.

Hereinafter, the performance of the environment-friendly glass material provided by the present invention will be described.

<Cutoff Performance>

The transmittance curve of a 3 mm glass sample at 300 nm-2000 nm is tested with a spectrometer in accordance with the method in GB/T7962.12-2010, and the transmittance at 5% becomes the cutoff wavelength. For the present invention, higher cutoff wavelength value indicates better cutoff performance of the glass, and lower cutoff wavelength value indicates poor cutoff performance.

In some implementations of the present invention, the cutoff wavelength of the environment-friendly glass material is above 550 nm, the cutoff wavelength is preferably above 600 nm, and the cutoff wavelength is more preferably above 650 nm, further preferably above 680 nm, more further preferably above 700 nm.

<Near-Infrared Transmittance>

The transmittance curve of the 3 mm glass sample at 300 nm-2000 nm is tested with a spectrometer in accordance with the method in GB/T7962.12-2010, and the near-infrared transmittance in the present invention refers to the transmittance value at 800 nm-2000 nm. The near-infrared transmittance in the present invention refers to the lowest transmittance within the corresponding band range.

In some implementations of the present invention, the environment-friendly glass material of the present invention has one or more of the following transmittances:

1) the transmittance at 800-850 nm is above 75%, the transmittance at 800-850 nm is preferably above 77%, and the transmittance at 800-850 nm is more preferably above 80%;
2) the transmittance at 850-900 nm is above 80%, the transmittance at 850-900 nm is preferably above 82%, and the transmittance at 850-900 nm is more preferably above 83%;
3) the transmittance at 900-1000 nm is above 83%, the transmittance at 900-1000 nm is preferably above 84%, and the transmittance at 900-1000 nm is more preferably above 85%;
4) the transmittance at 1000-2000 nm is above 85%, the transmittance at 1000-2000 nm is preferably above 86%, and the transmittance at 1000-2000 nm is more preferably above 87%.

<Acid Resistance Stability>

The acid resistance stability ($D_A$) (powder method) of the glass is tested as per the method specified in GB/T 17129. The acid resistance stability herein is sometimes referred to as acid resistance or acid resistance stability.

In some implementations of the present invention, the acid resistance stability ($D_A$) of the environment-friendly glass material is above Class 3, preferably above Class 2, more preferably Class 1.

<Water Resistance Stability>

The water resistance stability ($D_W$) (powder method) of the glass is tested as per the method specified in GB/T 17129. The water resistance stability herein is sometimes referred to as water resistance or water resistance stability.

In some implementations of the present invention, the water resistance stability ($D_W$) of the environment-friendly glass material is above Class 3, preferably above Class 2, more preferably Class 1.

<Thermal Expansion Coefficient>

The thermal expansion coefficient mentioned in the present invention refers to the average expansion coefficient of the glass at 20-300° C., which is represented by $\alpha_{20\text{-}300°\ C.}$ and tested in accordance with the method specified in GB/T7962.16-2010.

In some implementations of the present invention, the average thermal expansion coefficient stability ($\alpha_{20\text{-}3000°\ C.}$) of the environment-friendly glass material is above $80\times10^{-7}$/K, preferably above $85\times10^{-7}$/K, more preferably above $90\times10^{-7}$/K, further preferably above $95\times10^{-7}$/K.

[Manufacturing Method]

The manufacturing method of the environment-friendly glass material of the present invention comprises the following steps:

1) mixing all raw materials according to the component proportion of the environment-friendly glass material, putting the evenly mixed raw materials into a smelting furnace for melting at 1300-1500° C. to form molten glass;
2) stirring and homogenizing the molten glass;
3) pouring or leaking the molten glass into a mould for molding;
4) maintaining the glass molded in step 3) at 470-600° C. for 10-60 hours to perform color development; or maintaining at 470-600° C. for 10-60 hours to perform color development after the glass molded in step 3) is further processed into a glass preform or a glass element.

Furthermore, the raw materials of the above-mentioned environment-friendly glass material can use compound salt (such as carbonate, sulfate and nitrate), and/or hydroxide, and/or oxide, and/or sulfide, and/or selenide, and/or fluoride, and/or elementary substance.

[Glass Preform and Glass Element]

The glass preform can be made from the environment-friendly glass material formed by, for example, grinding or re-thermoforming, precision stamping and other compression molding means. That is to say, the glass preform can be made by grinding the environment-friendly glass material and other machining methods, or the glass preform can be made by making a preform for compression molding with the environment-friendly glass material, re-thermoforming this preform, and then grinding this preform, or the glass preform can be made by precision stamping of the preform made by grinding.

It should be noted that the means for preparing glass preform is not limited to the above means.

The glass preform and the glass element of the present invention are both formed by the environment-friendly glass material of the present invention described above. The glass preform of the present invention has excellent characteristics of the environment-friendly glass material; the glass element of the present invention has excellent characteristics of the environment-friendly glass material, and can provide such glass elements as various optical filter, lenses and prisms having a high value.

[Device]

The environment-friendly glass material of the present invention and glass element formed thereby can be used to make light filter, photographic equipment, camera equipment, display equipment, monitoring equipment, electronic equipment, intelligent equipment and other equipment.

Embodiment

The following non-limiting embodiments 1-22 are provided in order to further clearly explain and illustrate the technical solution of the present invention.

This embodiment obtains the environment-friendly glass material with the composition shown in Tables 1 to 3 by the above manufacturing method of the environment-friendly glass material. In addition, the characteristics of each glass are measured by the test method described in the present invention, and the measurement results are shown in Tables 1 to 3.

TABLE 1

| Component (wt %) | 1# | 2# | 3# | 4# | 5# | 6# | 7# | 8# |
|---|---|---|---|---|---|---|---|---|
| $SiO_2$ | 36 | 40 | 51 | 55 | 64 | 64 | 60 | 62 |
| $B_2O_3$ | 8 | 0 | 2 | 0 | 1 | 0 | 2 | 0 |
| F | 1 | 0 | 0 | 0 | 0 | 0 | 0.5 | 0.5 |
| $Al_2O_3$ | 2 | 4 | 2 | 0 | 0 | 0 | 0 | 0 |
| ZnO | 34 | 29.3 | 22 | 14 | 11 | 13.2 | 12 | 12.5 |
| BaO | 3 | 1 | 0 | 1 | 0 | 0 | 0 | 0 |
| CaO | 1 | 3 | 0 | 1 | 0 | 0 | 1.5 | 1 |
| MgO | 0 | 0 | 1 | 0 | 0 | 0 | 1 | 0 |
| SrO | 0 | 0 | 1 | 1 | 1 | 0 | 1 | 0 |
| $K_2O$ | 2 | 4 | 5 | 4 | 3 | 3.8 | 3 | 3.8 |
| $Na_2O$ | 6 | 8 | 8.7 | 15.3 | 11 | 13.2 | 12 | 12.7 |
| $Li_2O$ | 1.3 | 2 | 0 | 1 | 0.5 | 0 | 0 | 0 |
| S | 1 | 3 | 2.5 | 4 | 3 | 2.5 | 2.6 | 2.8 |
| Se | 0 | 0 | 0 | 0 | 0 | 0.2 | 0 | 0 |
| Sb | 3 | 4 | 4.2 | 3 | 3.9 | 3.1 | 3.5 | 3.2 |
| Ag | 0.5 | 0.3 | 0.2 | 0.2 | 0.3 | 0 | 0.3 | 0.2 |
| Ce | 0 | 0.3 | 0.2 | 0.3 | 1 | 0 | 0.3 | 0.3 |
| Sn | 0.7 | 0.9 | 0.1 | 0.2 | 0.2 | 0 | 0.2 | 1 |
| Te | 0.4 | 0 | 0.1 | 0 | 0.1 | 0 | 0.1 | 0 |
| V | 0 | 0.1 | 0 | 0 | 0 | 0 | 0 | 0 |
| Fe | 0.1 | 0.1 | 0 | 0 | 0 | 0 | 0 | 0 |
| Total | 100 | 100 | 100 | 100 | 100 | 100 | 100 | 100 |
| $B_2O_3/SiO_2$ | 0.22 | 0.00 | 0.04 | 0.00 | 0.02 | 0.00 | 0.03 | 0.00 |
| $ZnO/SiO_2$ | 0.94 | 0.73 | 0.43 | 0.25 | 0.17 | 0.21 | 0.20 | 0.20 |
| $Li_2O + Na_2O + K_2O$ | 9.30 | 14.00 | 13.70 | 20.30 | 14.50 | 17.00 | 15.00 | 16.50 |
| Sb + Ag + Ce + Sn + Te + V + Fe | 4.70 | 5.70 | 4.80 | 3.70 | 5.50 | 3.10 | 4.40 | 4.70 |
| Se/S | 0.00 | 0.00 | 0.00 | 0.00 | 0.00 | 0.08 | 0.00 | 0.00 |
| (Sb + Ag + Ce + Sn + Te + V + Fe)/(Se + S) | 4.70 | 1.90 | 1.92 | 0.93 | 1.83 | 1.15 | 1.69 | 1.68 |
| (Ag + Ce + Sn + Te + V + Fe)/Sb | 0.57 | 0.43 | 0.14 | 0.23 | 0.41 | 0.00 | 0.26 | 0.47 |
| $TiO_2$ | 0.001 | 0.005 | 0.002 | 0.001 | 0.01 | 0 | 0.001 | 0.001 |
| $P_2O_5$ | 0.002 | 0.002 | 0.001 | 0.001 | 0.01 | 0.001 | 0.001 | 0.001 |
| CuO | 0.005 | 0.003 | 0.003 | 0.003 | 0.02 | 0.007 | 0.003 | 0.003 |
| $CuO + TiO_2 + P_2O_5$ | 0.008 | 0.01 | 0.006 | 0.005 | 0.04 | 0.008 | 0.005 | 0.005 |
| Cutoff wavelength (nm) | 625 | 682 | 652 | 695 | 690 | 710 | 668 | 682 |
| 800-850 nm transmittance (%) | 90.6 | 85.1 | 90.4 | 80.2 | 80.2 | 78.9 | 83.2 | 88 |
| 850-900 nm transmittance (%) | 90.9 | 88.4 | 90.1 | 85 | 81.5 | 80.5 | 89 | 88.5 |
| 900-1000 nm transmittance (%) | 91.2 | 90 | 91.3 | 86.1 | 85.5 | 85.8 | 90.5 | 90.1 |
| 1000-2000 nm transmittance (%) | 91.2 | 91 | 91.3 | 90.1 | 88.7 | 87.6 | 91.3 | 90.5 |
| $D_W$ | 3 | Class 3 | Class 2 | Class 2 | Class 2 | Class 1 | Class 2 | Class 2 |
| $D_A$ | 2 | Class 2 | Class 2 | Class 2 | Class 2 | Class 2 | Class 2 | Class 2 |
| $\alpha_{20\text{-}300^\circ C}(\times 10^{-7}/K)$ | 112 | 105 | 103 | 104 | 100 | 99 | 96 | 99 |

TABLE 2

| Component (wt %) | 9# | 10# | 11# | 12# | 13# | 14# | 15# |
|---|---|---|---|---|---|---|---|
| $SiO_2$ | 70 | 74 | 38 | 39 | 49 | 54 | 64 |
| $B_2O_3$ | 0 | 2 | 6 | 0 | 0 | 1 | 0 |
| F | 0 | 0 | 0 | 0 | 0 | 0.5 | 0 |
| $Al_2O_3$ | 0 | 0 | 0 | 5 | 4 | 0 | 0 |
| ZnO | 5 | 6 | 33.3 | 29.3 | 22 | 13 | 12 |
| BaO | 0 | 0 | 3 | 2 | 0 | 1 | 0 |
| CaO | 0 | 0 | 1 | 2 | 0 | 0 | 0 |
| MgO | 0 | 0 | 0 | 0 | 1 | 1 | 0 |
| SrO | 0 | 0 | 0 | 0 | 1 | 1 | 0 |
| $K_2O$ | 4 | 3 | 3 | 4 | 5.5 | 4 | 3 |
| $Na_2O$ | 15 | 8.8 | 8 | 7.5 | 8 | 15 | 12 |
| $Li_2O$ | 1 | 3 | 1 | 2 | 0 | 1 | 0.5 |
| S | 2 | 1 | 1 | 3 | 2.5 | 4 | 3 |
| Se | 0 | 0 | 1 | 0.5 | 0.5 | 0.8 | 0.2 |

TABLE 2-continued

| Component (wt %) | 9# | 10# | 11# | 12# | 13# | 14# | 15# |
|---|---|---|---|---|---|---|---|
| Sb | 2 | 2 | 2.9 | 4 | 4.2 | 3 | 3.9 |
| Ag | 0.4 | 0.1 | 0.6 | 0.5 | 1 | 0.2 | 0.3 |
| Ce | 0.2 | 0.1 | 0 | 0.4 | 1 | 0.3 | 0.7 |
| Sn | 0.2 | 0 | 0.7 | 0.5 | 0.1 | 0.2 | 0.2 |
| Te | 0.2 | 0 | 0.5 | 0.3 | 0.2 | 0 | 0.1 |
| V | 0 | 0 | 0 | 0 | 0 | 0 | 0 |
| Fe | 0 | 0 | 0 | 0 | 0 | 0 | 0.1 |
| Total | 100 | 100 | 100 | 100 | 100 | 100 | 100 |
| $B_2O_3/SiO_2$ | 0.00 | 0.03 | 0.16 | 0.00 | 0.00 | 0.02 | 0.00 |
| $ZnO/SiO_2$ | 0.07 | 0.08 | 0.88 | 0.75 | 0.45 | 0.24 | 0.19 |
| $Li_2O + Na_2O + K_2O$ | 20.00 | 14.80 | 12.00 | 13.50 | 13.50 | 20.00 | 15.50 |
| Sb + Ag + Ce + Sn + Te + V + Fe | 3.00 | 2.20 | 4.70 | 5.70 | 6.50 | 3.70 | 5.30 |
| Se/S | 0.00 | 0.00 | 1.00 | 0.17 | 0.20 | 0.20 | 0.07 |
| (Sb + Ag + Ce + Sn + Te + V + Fe)/(Se + S) | 1.50 | 2.20 | 2.35 | 1.63 | 2.17 | 0.77 | 1.66 |
| (Ag + Ce + Sn + Te + V + Fe)/Sb | 0.50 | 0.10 | 0.62 | 0.43 | 0.55 | 0.23 | 0.36 |
| $TiO_2$ | 0.001 | 0.001 | 0.001 | 0.005 | 0.002 | 0.001 | 0.01 |
| $P_2O_5$ | 0.001 | 0.001 | 0.002 | 0.002 | 0.002 | 0.001 | 0.01 |
| CuO | 0.003 | 0.003 | 0.005 | 0.003 | 0.003 | 0.003 | 0.02 |
| $CuO + TiO_2 + P_2O_5$ | 0.005 | 0.005 | 0.008 | 0.01 | 0.007 | 0.005 | 0.04 |
| Cutoff wavelength (nm) | 642 | 636 | 689 | 700 | 693 | 720 | 701 |
| 800-850 nm transmittance (%) | 90 | 89.3 | 81.1 | 80.2 | 80.3 | 80 | 78 |
| 850-900 nm transmittance (%) | 90.1 | 90.5 | 82.3 | 82.1 | 83.2 | 80.5 | 80.1 |
| 900-1000 nm transmittance (%) | 90.5 | 90.8 | 85.6 | 86.2 | 87.1 | 86 | 85.1 |
| 1000-2000 nm transmittance (%) | 91 | 91.6 | 87.8 | 88.7 | 89.2 | 88.1 | 87.2 |
| $D_W$ | Class 1 | Class 1 | Class 3 | Class 3 | Class 2 | Class 2 | Class 2 |
| $D_A$ | Class 1 | Class 1 | Class 3 | Class 3 | Class 3 | Class 3 | Class 3 |
| $\alpha_{20\text{-}300^\circ C.}(\times 10^{-7}/K)$ | 89 | 85 | 110 | 104 | 102 | 102 | 101 |

TABLE 3

| Component (wt %) | 16# | 17# | 18# | 19# | 20# | 21# | 22# |
|---|---|---|---|---|---|---|---|
| $SiO_2$ | 62 | 66 | 66 | 73 | 62 | 60 | 68 |
| $B_2O_3$ | 0 | 1 | 0 | 1 | 0 | 2 | 0 |
| F | 0 | 0 | 0 | 0 | 0.5 | 0.5 | 0.5 |
| $Al_2O_3$ | 0 | 0 | 0 | 0 | 1 | 1 | 0 |
| ZnO | 15.2 | 12 | 11 | 8 | 11 | 12.5 | 6 |
| BaO | 0 | 0 | 0 | 0 | 0 | 0 | 0 |
| CaO | 0 | 0 | 1 | 0 | 0.5 | 1 | 0 |
| MgO | 0 | 0 | 0 | 0 | 2 | 0 | 0 |
| SrO | 0 | 0 | 0 | 0 | 1 | 0 | 0 |
| $K_2O$ | 4.5 | 3 | 3 | 4 | 3 | 2.5 | 5 |
| $Na_2O$ | 11.9 | 11.1 | 12 | 7 | 12 | 13 | 15 |
| $Li_2O$ | 0 | 0 | 0 | 2.2 | 0 | 0 | 0.5 |
| S | 2.2 | 2.6 | 2.6 | 1 | 2.6 | 2.85 | 2 |
| Se | 0 | 0.1 | 0 | 1 | 0.2 | 0.05 | 0.1 |
| Sb | 4.2 | 2.9 | 2.8 | 2 | 3.5 | 3.4 | 2 |
| Ag | 0 | 0.2 | 0.3 | 0.1 | 0.3 | 0.1 | 0.2 |
| Ce | 0 | 0.2 | 0.3 | 0.1 | 0.2 | 0.5 | 0.3 |
| Sn | 0 | 0.8 | 1 | 0.3 | 0.2 | 0.5 | 0.2 |
| Te | 0 | 0.1 | 0 | 0.3 | 0 | 0.1 | 0.2 |
| V | 0 | 0 | 0 | 0 | 0 | 0 | 0 |
| Fe | 0 | 0 | 0 | 0 | 0 | 0 | 0 |
| Total | 100 | 100 | 100 | 100 | 100 | 100 | 100 |
| $B_2O_3/SiO_2$ | 0.00 | 0.02 | 0.00 | 0.01 | 0.00 | 0.03 | 0.00 |
| $ZnO/SiO_2$ | 0.25 | 0.18 | 0.17 | 0.11 | 0.18 | 0.21 | 0.09 |
| $Li_2O + Na_2O + K_2O$ | 16.40 | 14.10 | 15.00 | 13.20 | 15.00 | 15.50 | 20.50 |
| Sb + Ag + Ce + Sn + Te + V + Fe | 4.20 | 4.20 | 4.40 | 2.80 | 4.20 | 4.60 | 2.90 |
| Se/S | 0.00 | 0.04 | 0.00 | 1.00 | 0.08 | 0.02 | 0.05 |
| (Sb + Ag + Ce + Sn + Te + V + Fe)/(Se + S) | 1.91 | 1.56 | 1.69 | 1.40 | 1.50 | 1.59 | 1.38 |
| (Ag + Ce + Sn + Te + V + Fe)/Sb | 0.00 | 0.45 | 0.57 | 0.40 | 0.20 | 0.35 | 0.45 |
| $TiO_2$ | 0.001 | 0.001 | 0.001 | 0.001 | 0.001 | 0.001 | 0.001 |
| $P_2O_5$ | 0 | 0.001 | 0.001 | 0.001 | 0.001 | 0.001 | 0.001 |
| CuO | 0.007 | 0.003 | 0.003 | 0.003 | 0.003 | 0.003 | 0.003 |
| $CuO + TiO_2 + P_2O_5$ | 0.008 | 0.005 | 0.005 | 0.005 | 0.005 | 0.005 | 0.005 |
| Cutoff wavelength (nm) | 675 | 690 | 678 | 652 | 683 | 698 | 668 |
| 800-850 nm transmittance (%) | 85.1 | 86.5 | 88.3 | 82.1 | 82.6 | 86.2 | 88.3 |
| 850-900 nm transmittance (%) | 87.4 | 88.7 | 89.2 | 83.2 | 87 | 87.9 | 89.2 |
| 900-1000 nm transmittance (%) | 90.2 | 90.2 | 90.4 | 85.3 | 90 | 89.9 | 90.3 |
| 1000-2000 nm transmittance (%) | 91.2 | 90.5 | 90.8 | 90.1 | 90.5 | 90.6 | 90.5 |

TABLE 3-continued

| Component (wt %) | 16# | 17# | 18# | 19# | 20# | 21# | 22# |
|---|---|---|---|---|---|---|---|
| $D_W$ | Class 2 | Class 2 | Class 2 | Class 1 | Class 2 | Class 2 | Class 1 |
| $D_A$ | Class 1 | Class 3 | Class 2 | Class 1 | Class 3 | Class 3 | Class 1 |
| $\alpha_{20\text{-}300^\circ\ C.}(\times 10^{-7}/K)$ | 96 | 99 | 98 | 83 | 95 | 97 | 87 |

The invention claimed is:

1. An environment-friendly glass material comprising the following components by weight percentage: 35-80% of $SiO_2$; 5-35% of ZnO; 5-25% of $Na_2O$; 1-8% of $K_2O$; 0.2-8% of S; 0-3% of $B_2O_2$, wherein the environment-friendly glass material does not contain Cd, wherein when the thickness of the environment-friendly glass material is 3 mm, the cutoff wavelength is above 550 nm, the transmittance at 800-850 nm is above 75%, the transmittance at 850-900 nm is above 80%, the transmittance at 900-1000 nm is above 83%, and the transmittance at 1000-2000 nm is above 85%.

2. The environment-friendly glass material according to claim 1, wherein when the thickness of the environment-friendly glass material is 3 mm, satisfying one or more of the following 5 situations:

1) the cutoff wavelength is above 650 nm;
2) the transmittance at 800-850 nm is above 77%;
3) the transmittance at 850-900 nm is above 82%;
4) the transmittance at 900-1000 nm is above 84%;
5) the transmittance at 1000-2000 nm is above 86%.

3. The environment-friendly glass material according to claim 1, wherein when the thickness of the environment-friendly glass material is 3 mm, satisfying one or more of the following 5 situations:

1) the cutoff wavelength is above 700 nm;
2) the transmittance at 800-850 nm is above 80%;
3) the transmittance at 850-900 nm is above 83%;
4) the transmittance at 900-1000 nm is above 85%;
5) the transmittance at 1000-2000 nm is above 87%.

4. The environment-friendly glass material according to claim 1, comprising the following components by weight percentage: 0.5-10% of Sb+Ag+Ce+Sn+Te+V+Fe; and/or 0-5% of $Li_2O$; and/or 0-5% of $Al_2O_3$; and/or 0-5% of MgO; and/or 0-5% of CaO; and/or 0-10% of SrO; and/or 0-10% of BaO; and/or 0-5% of Se; and/or 0-5% of F.

5. An environment-friendly glass material, comprising the following components by weight percentage: 35-80% of $SiO_2$; 5-35% of ZnO; 5-25% of $Na_2O$; 1-8% of $K_2O$; 0-5% of $Li_2O$; 0.2-8% of S; 0.5-10% of Sb+Ag+Ce+Sn+Te+V+Fe; 0-3% of $B_2O_3$; 0-5% of $Al_2O_3$; 0-5% of MgO; 0-5% of CaO; 0-10% of SrO; 0-10% of BaO; 0-5% of Se; 0-5% of F and do not contain Cd.

6. The environment-friendly glass material according to claim 1, comprising the following components by weight percentage: 40-75% of $SiO_2$; and/or 7-30% of ZnO; and/or 7-22% of $Na_2O$; and/or 2-8% of $K_2O$; and/or 0-3% of $Li_2O$; and/or 0.5-7% of S; and/or 0.8-9% of Sb+Ag+Ce+Sn+Te+V+Fe; and/or 0-3% of $Al_2O_3$; and/or 0-3% of MgO; and/or 0-3% of CaO; and/or 0-5% of SrO; and/or 0-5% of BaO; and/or 0-4% of Se; and/or 0-3% of F.

7. The environment-friendly glass material according to claim 1, comprising the following components by weight percentage: 42-73% of $SiO_2$; and/or 9-25% of ZnO; and/or 8-19% of $Na_2O$; and/or 3-7% of $K_2O$; and/or 1-6% of S; and/or 0.9-8% of Sb+Ag+Ce+Sn+Te+V+Fe; and/or 0-3% of Se; and/or 0-2% of $Li_2O$; and/or 0-1% of $Al_2O_3$; and/or 0-2% of MgO; and/or 0-2% of CaO; and/or 0-2% of SrO; and/or 0-2% of BaO; and/or 0-1% of F.

8. The environment-friendly glass material according to claim 1, comprising the following components by weight percentage: 0-0.5% of $CuO+TiO_2+P_2O_5$.

9. The environment-friendly glass material according to claim 1, comprising the following components by weight percentage: 0.0001-0.3% of $CuO+TiO_2+P_2O_5$.

10. The environment-friendly glass material according to claim 1, wherein the component thereof is expressed in weight percentage, satisfying one or more of the following 6 situations:

1) $B_2O_3/SiO_2$ is below 0.23;
2) $ZnO/SiO_2$ is 0.07-0.95;
3) Se/S is below 1.5;
4) (Sb+Ag+Ce+Sn+Te+V+Fe)/(Se+S) is 0.1-25.0;
5) (Ag+Ce+Sn+Te+V+Fe)/Sb is below 3.0;
6) $Li_2O+Na_2O+K_2O$ is 8-35%.

11. The environment-friendly glass material according to claim 1, wherein the component thereof is expressed in weight percentage, satisfying one or more of the following 6 situations:

1) $B_2O_3/SiO_2$ is below 0.15;
2) $ZnO/SiO_2$ is 0.10-0.75;
3) Se/S is below 1.0;
4) (Sb+Ag+Ce+Sn+Te+V+Fe)/(Se+S) is 0.5-8.0;
5) (Ag+Ce+Sn+Te+V+Fe)/Sb is below 2.0;
6) $Li_2O+Na_2O+K_2O$ is 9-30%.

12. The environment-friendly glass material according to claim 1, wherein the component thereof is expressed in weight percentage, satisfying one or more of the following 6 situations:

1) $B_2O_3/SiO_2$ is below 0.1;
2) $ZnO/SiO_2$ is 0.15-0.60;
3) Se/S is below 0.5;
4) (Sb+Ag+Ce+Sn+Te+V+Fe)/(Se+S) is 1.0-5.0;
5) (Ag+Ce+Sn+Te+V+Fe)/Sb is below 0.8;
6) $Li_2O+Na_2O+K_2O$ is 10-22%.

13. The environment-friendly glass material according to claim 5, wherein when the thickness of the environment-friendly glass material is 3 mm, the cutoff wavelength is above 600 nm; and/or the transmittance at 800-850 nm is above 77%; and/or the transmittance at 850-900 nm is above 82%; and/or the transmittance at 900-1000 nm is above 84%; and/or the transmittance at 1000-2000 nm is above 86%.

14. The environment-friendly glass material according to claim 5, wherein when the thickness of the environment-friendly glass material is 3 mm, the cutoff wavelength is above 700 nm; and/or the transmittance at 800-850 nm is above 80%; and/or the transmittance at 850-900 nm is above 83%; and/or the transmittance at 900-1000 nm is above 85%; and/or the transmittance at 1000-2000 nm is above 87%.

15. The environment-friendly glass material according to claim 1, wherein acid resistance stability of the environment-friendly glass material is Class 1; and/or water resistance stability is Class 1; and/or thermal expansion coefficient is above 95×10-7/K.

16. A glass preform, made of the environment-friendly glass material according to claim 1.

17. A glass element, made of the environment-friendly glass material according to claim 1.

18. A device, comprising the environment-friendly glass material according to claim 1.

19. The manufacturing method of the environment-friendly glass material according to claim 1, wherein the method comprises the following steps:

1) mixing all raw materials according to the component proportion of the environment-friendly glass material to form evenly mixed raw materials, putting the evenly mixed raw materials into a smelting furnace for melting at 1300-1500° C. to form molten glass;
2) stirring and homogenizing the molten glass;
3) pouring or leaking the molten glass into a mould for molding;
4) maintaining the glass molded in step 3) at 470-600° C. for 10-60 hours to perform color development, or maintaining at 470-600° C. for 10-60 hours to perform color development after the glass molded in step 3) is further processed into a glass preform or a glass element.

20. The manufacturing method of the environment-friendly glass material according to claim 19, wherein the raw material of the environment-friendly glass material uses compound salt, and/or hydroxide, and/or oxide, and/or sulfide, and/or selenide, and/or fluoride, and/or elementary substance.

21. The environment-friendly glass material according to claim 1, wherein the content of S is a content of sulfur in all sulfur-containing substances in the glass that are completely converted to elemental sulfur.

22. The environment-friendly glass material according to claim 21, wherein the content of S is 1 to 6%.

* * * * *